Jan. 3, 1939. R. E. OTTENHEIMER Re. 20,966

REFRIGERATING CASE

Original Filed Jan. 31, 1925. 2 Sheets-Sheet 1

Inventor
Reuben E. Ottenheimer.
Dodge and Sons
Attorneys

Jan. 3, 1939. R. E. OTTENHEIMER Re. 20,966

REFRIGERATING CASE

Original Filed Jan. 31, 1925 2 Sheets-Sheet 2

Inventor

Reuben E. Ottenheimer

Dodge Aug Sons

Attorneys

Reissued Jan. 3, 1939

Re. 20,966

UNITED STATES PATENT OFFICE 20,966

REFRIGERATING CASE

Reuben E. Ottenheimer, Baltimore, Md., assignor, by direct and mesne assignments, of one-half to Ottenheimer Bros., Inc., Baltimore, Md., a corporation of Maryland, and one-half to Emanuel E. Ottenheimer, Baltimore, Md.

Original No. 1,572,855, dated February 9, 1926, Serial No. 6,151, January 31, 1925. Reissue No. 16,941, dated April 24, 1928, Serial No. 252,920, February 8, 1928. This application for reissue March 14, 1938, Serial No. 195,930

7 Claims. (Cl. 62—37)

This invention relates to refrigerators and particularly to a refrigerated show-case provided with means for illuminating its interior.

Illumination of refrigerated show-cases is a difficult problem for the reason that the heating effect of the lamps must be minimized. Satisfactory illumination cannot be had from lamps located outside the case, and so far as I am advised no satisfactory way of using them within the case has been devised. The present invention solves this problem by the co-ordination of a number of special features, certain of which are not novel in themselves, in such manner that in conjunction they produce a new and better result.

Generally stated, I locate the lamps in a portion of the frame structure of the case at the top where they are completely housed and may readily be concealed from the customer. Though they are then in effect within the case, they are isolated from the interior of the case by a glass panel through which their light is projected. Any light transmitting material which would serve as a reasonably good insulator against the passage of heat might be substituted for glass. The heat given off by the lamps is largely dissipated by convection through vent ports formed in the top of the lamp-housing structure.

The glass panel below the lamps serves to reduce the transmission of heat, but alone is not always adequate to effect this result. Accordingly I so locate the lamps and so arrange certain screens or baffles that the circulation of air within the refrigerator does not pass close to this glass panel. Stated differently, I maintain immediately below the panel a layer of inert or non-circulating air which serves effectually to retard the transfer of heat, and which, as it becomes heated, inherently seeks a position in the top of the case outside the path of circulation within the case. Whenever the case is open for service there is an opportunity for part or all of this heated air to escape, and this assists in dissipating the heat of the lamps and reducing their heating action within the case.

The advantages of the invention may be secured with structures differing somewhat in detail, but the best embodiment of it known to me is illustrated in the accompanying drawings, in which—

Figure 1:
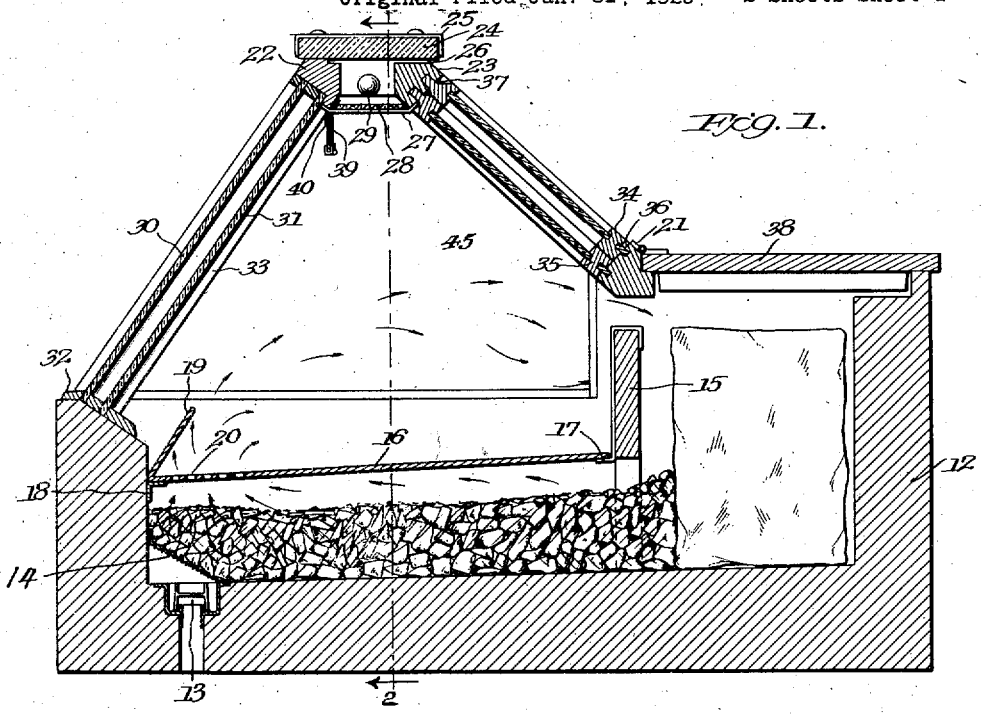
Fig. 1 is a vertical transverse section through a refrigerated show-case embodying my invention.
Figure 2:
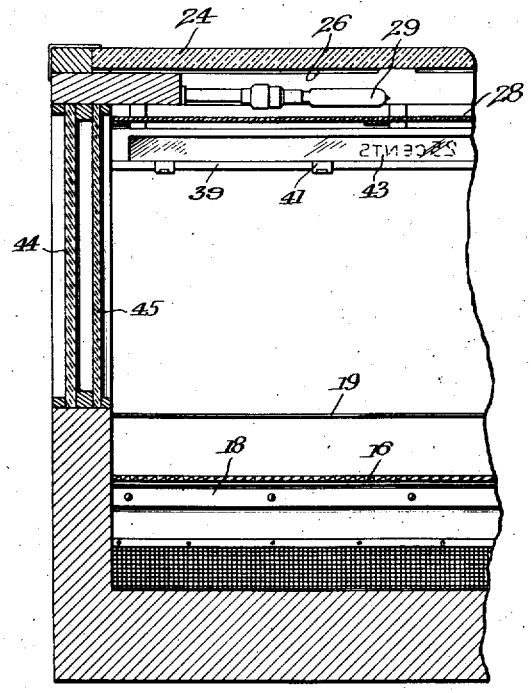
Fig. 2 is a section on the line 2—2 of Fig. 1.
Figure 5:
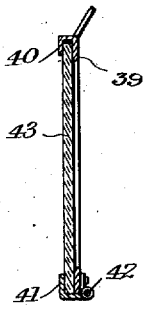
Fig. 5 is a transverse section showing the construction of the combined baffle and display sign.
Figure 3:
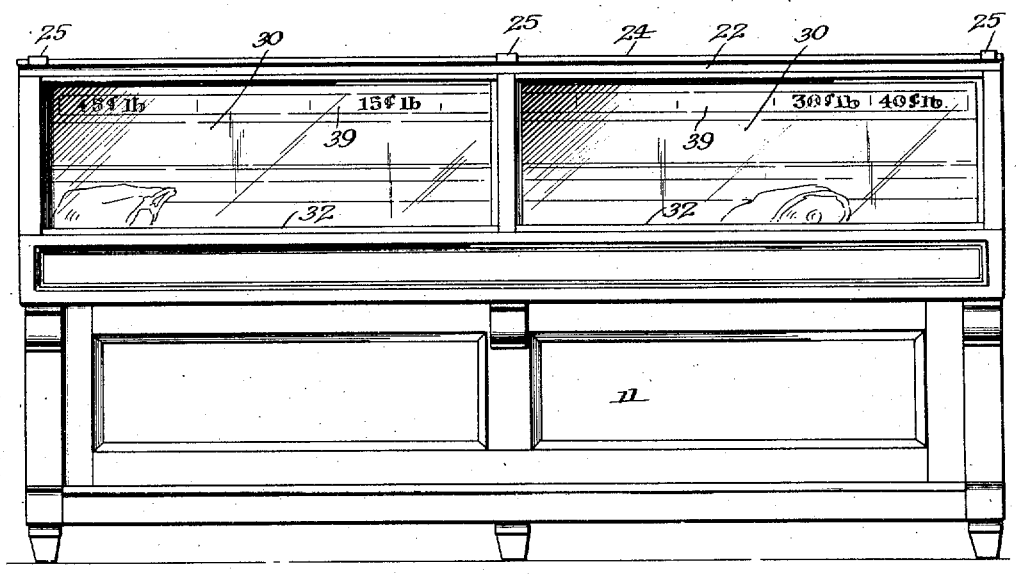
Fig. 3 is a front elevation of the complete case.
Figure 4:
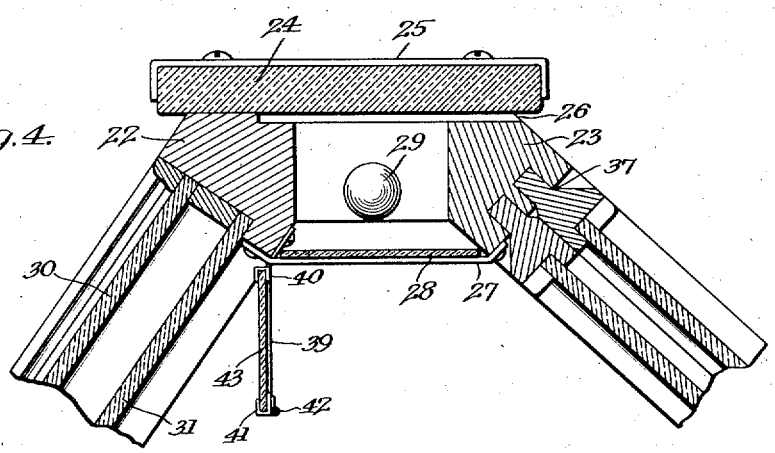
Fig. 4 is an enlarged fragmentary section through the upper portion of the case.

In the drawings certain structural details, such as parts of the framing and insulation of the body of the show-case, are omitted to simplify the drawings. Any of the known body structures may be used.

The refrigerated show-case is supported by any suitable means such as the base 11. Its bottom consists of a water-tight insulated body portion 12 whose form is shown in the drawings, and whose exact construction is not material to the invention. Ordinarily it would be constructed of wood with the usual insulation, and would be internally lined with some non-corrosive metal, as is familiar to those skilled in the art. The floor of the body portion 12 slopes forward to a drain 13 of ordinary form which is protected by a screen 14.

The body portion 12 is higher at its rear than at its front, and is sub-divided into a display space and a space to house the refrigerating means by a vertical partition 15 and a forwardly sloping, but approximately horizontal, shelf 16. The vertical partition 15 is located about two-thirds of the distance from the front to the back of the case. It extends the entire length of the case, but is spaced from the top and bottom thereof, as clearly shown in Fig. 1, to permit air circulation rearward over it and forward beneath it.

A flange 17 carried by the partition 15 serves to support the shelf 16 at its rear end. This shelf rests at its forward end on an angle strip 18. The shelf 16 is preferably constructed of a plurality of sections for ease in removal, and is provided along the edge adjacent the front of the case with an upstanding, rearwardly inclined baffle 19. This preferably partly overhangs a series of air ports 20 formed in the shelf 16 along the front of the show-case. The openings 20 might be otherwise located, but I prefer the location shown.

The exact construction of the shelf is not a feature of the present invention, but I have chosen for illustration a type of shelf described and claimed in my companion application Serial No. 6,150, filed January 31, 1925, and consequently I make no claim to the shelf per se in the present application.

Blocks of ice may be placed in the space to the rear of the partition 15, or refrigerating coils for mechanical refrigeration may be there installed. Also, it is feasible, though not generally necessary, to place crushed ice or refrigerating coils beneath the shelf, leaving the necessary space for air circulation.

A longitudinal frame member or rail 21 overlies the partition 15 and serves as the rear support for a display case of approximately triangular cross section. This includes two longitudinal top rails 22 and 23 spaced apart to receive the light equipment between them. They are bridged at the top by an overlying strip of marble, translucent or opaque glass, or the like, 24, retained by clamp strips 25. When translucent material is used articles placed thereon may be illuminated. The member 23 is recessed on its top face to form long narrow slots 26 which serve to ventilate the lamp space between the rails 22 and 23. A series of clips or cross members 27 extending between the lower faces of the rails 22 and 23 carry a light transmitting panel 28 which isolates the lamp space between the rails 22 and 23 from the interior of the show-case. This panel is ordinarily made of glass. Ordinary incandescent lamps lighted in the usual manner are shown at 29.

The front of the show-case is made up of glass panels and is double glazed, as indicated at 30, 31. These panels are held between mold strips 32 on the body portion 12 and on the front rail 22, and also by inclined rabbeted frame members 33 which connect the front rail 22 with the front of the body portion 12. The rear of the display case portion is closed by a series of single glazed sliding sash 34, 35. These slide on separate parallel tracks or grooves 36, 37, and overlap each other slightly at their ends when closed, as is usual. Between the rail 21 and the rear of the body portion 12 there are hinged doors 38 which may be opened to permit the insertion of the necessary ice when ice is used.

Depending from the front rail 22 within the case in a substantially vertical portion is a member which serves as a combined baffle and illuminated display sign. Its baffle function is the one of primary importance, but since its location is suitable for a sign and for the illumination thereof, I prefer to embody these features in it. The baffle, therefore, consists of a frame member 39 arranged to permit the passage of light, and having a fixed channel member 40 at its top and a swinging channel-like sign-retaining member 41 at its bottom. The member 41 is mounted on a spring hinge 42 which normally retains it in its upward or sign-supporting position.

The sign 43 consists of an imperforate strip and therefore acts as an effective baffle. This strip preferably is translucent and carries letters or characters formed in opaque material, but any other arrangement may be used provided the characters are rendered visible by the lamps 29. The signs 43 are inserted by drawing down the spring-held member 41, inserting the upper edge in the channel 40, and then releasing the spring-urged member 41 so that it swings up and engages the lower edge of the sign.

The ends of the display portion of the case are closed by glass panels, and are double glazed, as indicated at 44, 45. In an illuminated case transparent end panels are satisfactory, but they are objectionable in an unilluminated case because of the effects of cross lights. Hence where the case is to be lighted only part of the time, the interior end panel may to advantage be silvered so as to act as a light reflector and shut off cross lights which would enter through the ends. The double glazing is an important factor in effective insulation.

It is possible to place display signs or price tickets on the forward face of the baffle 19, and this possibility is useful and attractive commercially.

This being the general construction of the case, it is important to note the preferred relation of the parts for this has much to do with securing the best results. The front panels are quite sharply inclined to the rear, and together with the rear sliding doors confine a narrow inert air zone which extends well above the path of air circulation. The circulating air rises through the ports 20, is deflected to the rear by the baffle 19, and passes into the refrigerating space through the slot-like port between the top of the partition 15 and the bottom of the rail 21. This current, flowing rearwardly across the case, would have a tendency to cause a secondary circulation or eddy in the air in the top of the case, and if such circulation occurred, a certain amount of the air heated by the lamps 29 would mix with the air circulating through the shelf and downward through the refrigerating space and thus raise the temperature in the bottom portion of the case. The baffle formed by the sign 43, however, has the effect of checking any eddy flow, and preserves in the top or apex portion of the case a practically inert body of air which absorbs most of the heat radiating into the case from the lamps, and prevents its convection into the cold air at the lower portion of the case. Even if the air in the top of the case should become quite highly heated, much of it would escape whenever the doors 34, 35 are opened, as they are whenever sales are made.

Another effect performed primarily by the baffle 19, but assisted in some degree by the baffling effect of the sign 43, is the preservation adjacent the inner glass panel 31 of a non-circulating or inert body of air. For this reason the glass panels 30 and 31 are not as cold as they would otherwise be, and condensation on the outside of the glass occurs to a far less extent than with cases lacking these baffles.

The location of the lamps in a narrow pocket at the apex of the case is desirable, both as minimizing the heating effect of the lamps and as offering a position favorable to the very best illumination. Everything on the shelf 16 is illuminated. The sign baffle 43 is also illuminated and shades the interior surface of the glass panel 31. This reduces reflection and refraction effects which would tend to produce ghosts and reduce the visibility through the glass from certain angles.

In short, the various details of the case are so designed and coordinated as to secure uniform illumination from a concealed source, effective arrest and dissipation of heat from said source, and sustained visibility through the transparent walls of the display case. With these major features are combined effectively place and brightly illuminated signs which are so combined with the necessary baffles that they never interfere with the desired air circulation.

What is claimed is:

1. The combination of a display case having a wide bottom, a top defined by a narrow frame structure, and an inclined transparent front sustained at its upper edge by said frame structure; artificial lighting means housed within said frame structure; a shelf for displaying goods in the lower portion of said case; refrigerating means including a baffle arranged to cause a current of cool air to circulate beneath and closely over said shelf; and a baffle adjacent said lightning means arranged to obstruct air circulation immediately beneath said lighting means.

2. The combination of a display case; means for displaying goods near the bottom of said case; refrigerating means for cooling the goods displayed; artificial lighting means housed in the top of said case and arranged to illuminate the goods displayed; and a baffle mounted in the top of said case beneath said lights, and serving to maintain there an inert body of relatively warm air.

3. The combination of a display case having a wide bottom, a narrow top and an inclined transparent front panel; artificial lighting means mounted in said narrow top; a light transmitting partition for retarding the flow of heat from the lighting means to the lower portion of the case; a baffle extending downward from said partition to preserve a body of inert air adjacent thereto; and refrigerating means arranged to produce a circulation of cold air in said case.

4. The combination of a display case having a wide bottom, a narrow top and an inclined transparent front panel; artificial illuminating means mounted in said narrow top; a combined sign and baffle located beneath said illuminating means in position to be lighted thereby and to maintain a body of non-circulating air immediately beneath the illuminating means; and refrigerating means arranged to produce a circulation of cold air in the lower portion of said case.

5. The combination of a display case having a wide bottom, a top frame structure including closely spaced members, and an inclined transparent front panel supported at its top edge by said frame structure; artificial lighting means mounted between said closely spaced members; a glass panel underlying said lighting means; means for venting heated air from the space above said underlying panel; a baffle beneath and adjacent said underlying panel and serving to retain a body of inert air adjacent thereto; refrigerating means serving to produce an air circulation in the lower portion of said case; and a baffle serving to direct said circulation away from said front panel.

6. The combination of a display case having a transparent front; artificial lighting means mounted adjacent the upper edge of said transparent front adapted to illuminate the interior of said case; refrigerating means serving to produce an air circulation in said case; and a baffle mounted adjacent said artificial lighting means in the upper portion of said case serving to retard air circulation adjacent said lighting means, and to shade said transparent front panel from light transmitted directly from said artificial lighting means.

7. The combination of a display case having at least one transparent wall, refrigerating means associated with said case and so arranged as to induce convection cooling currents in the air contained in said case; illuminating means at the top of the case isolated from the interior thereof by a light transmitting partition; and means serving to control the flow of said convection currents and minimize such flow adjacent said transparent wall and said partition.

REUBEN E. OTTENHEIMER.